United States Patent
Zhang et al.

(10) Patent No.: US 11,851,967 B2
(45) Date of Patent: Dec. 26, 2023

(54) DISINTEGRABLE DOWNHOLE TOOLS AND METHOD OF USE

(71) Applicants: Zhihui Zhang, Katy, TX (US); Emerson Nunez, Cypress, TX (US)

(72) Inventors: Zhihui Zhang, Katy, TX (US); Emerson Nunez, Cypress, TX (US)

(73) Assignee: BAKER HUGHES OILFIELD OPERATIONS LLC, Houston, TX (US)

( * ) Notice: Subject to any disclaimer, the term of this patent is extended or adjusted under 35 U.S.C. 154(b) by 160 days.

(21) Appl. No.: 17/669,908

(22) Filed: Feb. 11, 2022

(65) Prior Publication Data
US 2023/0304370 A1 Sep. 28, 2023

(51) Int. Cl.
*E21B 29/02* (2006.01)
*C08G 59/24* (2006.01)
*C08J 11/12* (2006.01)
*C08J 5/04* (2006.01)
*E21B 34/06* (2006.01)

(52) U.S. Cl.
CPC ............ *E21B 29/02* (2013.01); *C08G 59/245* (2013.01); *C08J 5/04* (2013.01); *C08J 11/12* (2013.01); *C08J 2363/00* (2013.01); *E21B 34/063* (2013.01)

(58) Field of Classification Search
CPC ......... E21B 29/02; C08J 5/04; C08J 2363/00; C08L 11/12; C08G 59/245
See application file for complete search history.

(56) References Cited

U.S. PATENT DOCUMENTS

| 6,245,841 B1 | 6/2001 | Yeager et al. |
| 10,309,183 B2 | 6/2019 | Cutler |
| 2005/0205265 A1 | 9/2005 | Todd et al. |
| 2015/0239795 A1 | 8/2015 | Doud et al. |
| 2016/0130906 A1 | 5/2016 | Garvey et al. |
| 2018/0171757 A1 | 6/2018 | Xu |

FOREIGN PATENT DOCUMENTS

EP 0396383 A2 11/1990

OTHER PUBLICATIONS

International Search Report for International Application No. PCT/US2023/012610, International Filing Date Feb. 8, 2023, dated May 31, 2023, 4 pages.
Written Opinion for International Application No. PCT/US2023/012610, International Filing Date Feb. 8, 2023, dated May 31, 2023, 5 pages.

*Primary Examiner* — Kristyn A Hall
(74) *Attorney, Agent, or Firm* — CANTOR COLBURN LLP

(57) ABSTRACT

A downhole assembly includes a disintegrable article, which contains a polymer matrix comprising a polymer having an oxygen content of about 2 wt % to about 30 wt %; an energetic material configured to generate heat upon activation to facilitate a chemical decomposition of the polymer; and at least one of a reinforcing fiber or a filler. The disintegrable article is disintegrated by disposing the downhole assembly in a downhole environment; performing a downhole operation; exposing the polymer in the polymer matrix to the generated heat to chemically decompose the polymer producing a decomposed product containing a small molecule in a supercritical state; and disintegrating the disintegrable article with the small molecule in the supercritical state.

21 Claims, 3 Drawing Sheets

DISINTEGRABLE DOWNHOLE TOOLS AND METHOD OF USE

BACKGROUND

Oil and natural gas wells often utilize wellbore components or tools that, due to their function, are only required to have limited service lives that are considerably less than the service life of the well. After a component or tool service function is complete, it must be removed or disposed of in order to recover the original size of the fluid pathway for use, including hydrocarbon production, $CO_2$ sequestration, etc.

Self-disintegrating or interventionless downhole tools have been developed. Instead of milling or drilling operations, these tools can be removed by dissolution of engineering materials using various wellbore fluids. One challenge for the self-disintegrating or interventionless downhole tools is that the disintegration process can start as soon as the conditions in the well allow the degradation reaction of the engineering material to start. In addition, it can take longer than desired to dissolve the tools when they are no longer needed. Thus the disintegration period is not controllable as it is desired by the users but rather ruled by the well conditions and product properties.

Downhole tools that can instantly disintegrate in response to a command or triggering signal have been proposed. Such tools include an explosive material which can be activated to disintegrate the tool when it is no longer needed. However, the energy release rates in the explosive reactions are difficult to control as the reactions are normally very fast and can release more energy than desired in a short period of time.

Accordingly, there is a continuing need for downhole tools that have minimal or no disintegration during the service of the tools so that they have the mechanical properties necessary to perform their intended function and then rapidly disintegrate in response to a customer command. It would be a further advantage if such tools can also disintegrate in a safe and controlled manner.

BRIEF DESCRIPTION

A downhole assembly includes a disintegrable article that contains a polymer matrix including a polymer having an oxygen content of about 2 wt % to about 30 wt %; an energetic material configured to generate heat upon activation to facilitate a chemical decomposition of the polymer; and at least a reinforcing fiber or a filler.

A method of controllably removing a disintegrable article comprises: disposing the downhole assembly as described hereinabove in a downhole environment; performing a downhole operation; activating the energetic material by initiating a self-propagation reaction of the energetic material to generate heat; exposing the polymer in the polymer matrix to the generated heat to chemically decompose the polymer producing a decomposed product comprising a small molecule in a supercritical state; and disintegrating the disintegrable article with the small molecule in the supercritical state.

BRIEF DESCRIPTION OF THE DRAWINGS

The following descriptions should not be considered limiting in any way. With reference to the accompanying drawings, like elements are numbered alike.

DETAILED DESCRIPTION

Figure 1A:
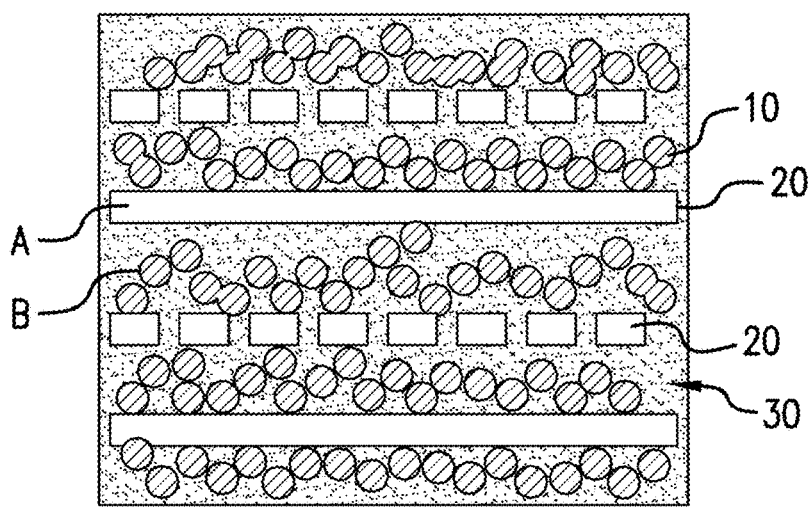
FIG. 1A is a schematic diagram of an embodiment of a disintegrable downhole article comprising a polymer matrix, an energetic material, and an reinforcing fiber.

The disclosure provides downhole articles that have minimized disintegration rate or no disintegration while the articles are in service but can instantly but safely and controllably disintegrate in response to a triggering signal or activation command. The disintegrable articles include a polymer matrix; an energetic material configured to generate heat upon activation to facilitate a chemical decomposition of the disintegrable article; and at least one of a reinforcing fiber or a filler.

The downhole articles have high strength and can be used in various applications. When no longer needed, upon activation, the energetic material in the downhole articles can undergo a self-sustained and self-propagated reaction that is not affected by downhole fluid or hydrostatic pressure. The self-sustained and self-propagated reaction generates heat and chemically decomposes a polymer in the polymer matrix. The decomposed product generated from the polymer decomposition includes small molecules that can turn into a supercritical state when the temperature and pressure applied to the small molecules exceed the supercritical temperature and the supercritical pressure of the small molecules. Advantageously, the generation of the small molecules in a supercritical state does not lead to dramatic pressure change, but nonetheless can facilitate the disintegration of the downhole articles in a safe and controllable manner.

The polymer matrix comprises a polymer, which provides the general material properties such as strength and ductility for tool functions. The polymer is non-corrodible in a downhole fluid such as water, a brine, or an acid. The polymer in the polymer matrix has an oxygen content of about 2 to about 30 wt %, preferably about 3 to about 25 wt %, more preferably about 5 to about 20 wt %, based on a total weight of the polymer. Without wishing to be bound by theory, it is believed that when the polymer has an oxygen content within these ranges, the polymer undergoes appropriate activation and decomposition with the energetic materials leading to the decomposed product including a small molecule that can turn into a supercritical state to facilitate the disintegration of the downhole articles in a safe and controlled manner. The polymer can include at least one of an epoxy, a phenolic resin, an epoxy phenolic resin, a vinyl ester, a polybismaleimide, a cyanate ester, or a polyester.

As used herein, an epoxy refers to a cured product of an epoxide that contains one or more epoxide groups. The preferred epoxy suitable for use in the disintegrable articles can be formed from at least one of an aliphatic epoxide such as butanediol diglycidyl ether, a bisphenol epoxide such as bisphenol-A diglycidyl ether (CAS #1675-54-3) and/or bisphenol-F diglycidyl ether, or a novolac epoxide such as phenol-formaldehyde polymer glycidyl ether (CAS #28064-14-4). The curing agent includes an active group that can react with an epoxy group. Examples of such an active group include amino groups and acid anhydride groups. In an aspect the curing agent is at least one of an aliphatic amine or an aromatic amine.

The epoxy can contain an aromatic structure and an aliphatic structure in the backbone of the polymers, where the aliphatic structure contains an ether (C—O) bond. The aromatic structure may be difficult to decompose while the aliphatic structure may be easier to decompose. In an aspect, the epoxy contains a polymerized diglycidylether of a bisphenol wherein the number of the repeating units range from 0 to 18, preferably 0 to less than 2.5. For example the epoxy can include a bisphenol A diglycidyl ether epoxy having the formula

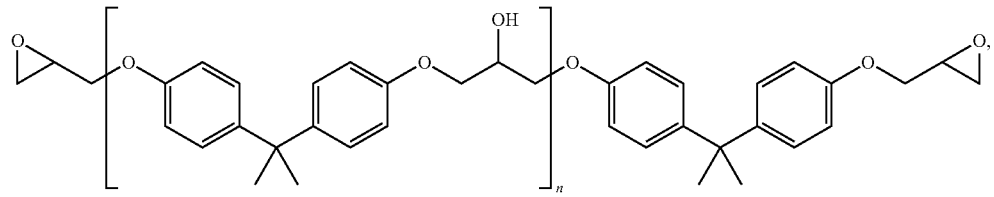

wherein n is the number of repeating units, and can be 0 to 18, preferably 0 to less than 2.5. Without wishing to be bound by theory, it is believed that when the repeating units are within these ranges, the epoxy can readily decompose when exposed to the heat generated by the self-propagation reaction of the energetic material described herein.

Phenolic resin, also known as phenolic formaldehyde resin, is a synthetic resin produced from the polymerization of a phenol ($C_6H_5OH$), an alkyl-substituted phenol, a halogen-substituted phenol, or a combination thereof, and a formaldehyde compound such as formaldehyde ($CH_2$=O). The polymer can include repeating units such as —[($C_6H_3OH$)—$CH_2$]—.

Epoxy phenolic resin is phenolic resin modified at the phenolic hydroxyl group to include an epoxide functional group such as —$CH_2$—($C_2H_3O$), where —($C_2H_3O$) is a three-membered epoxide ring. The added functionality of the phenolic resin increases the ability for the resin to crosslink, creating a stronger polymer with high resistivities.

Vinyl ester (vinyl acetate) is a resin produced by the esterification of an epoxy resin with acrylic or methacrylic acids.

The polybismaleimide can be synthesized by condensation of phthalic anhydride with an aromatic diamine, which yields bismaleimide such as 4,4'-bismaleimidodiphenylmethane, followed by subsequent Michael addition of more diamine to the double bond at the ends of the bismaleimide. The monomer bismaleimide can also be copolymerized with vinyl and allyl compounds, allyl phenols, isocyanates, aromatic amines, or a combination thereof. Bismaleimide is often copolymerized with 2,2'-diallyl bisphenol A.

Cyanate esters are compounds generally based on a phenol or a novolac derivative, in which the hydrogen atom of the phenolic OH group is substituted by a cyanide group (—OCN). Suitable cyanate esters include those described in U.S. Pat. No. 6,245,841 and EP 0396383. Cyanate esters can be cured and postcured by heating, either alone, or in the presence of a catalyst. Curing normally occurs via cyclotrimerization (an addition process) of three CN groups to form three-dimensional networks comprising triazine rings.

The polyester can be formed by the reaction of a dibasic organic acid and a dihydric alcohol. Orthophthalic polyesters are made by phthalic anhydride with either maleic anhydride or fumaric acid. Isophthalic polyesters are made from isophthalic acid or terephthalic acid. Isophthalic polyesters are preferred due to the improved corrosion resistance and mechanical properties.

Use of energetic materials disclosed herein is advantageous as these energetic materials are stable at wellbore temperatures but can undergo a self-sustained and self-propagated reaction that is not affected by downhole fluid or hydrostatic pressure. In addition, the energetic material can react without the need for environmental oxygen supply. The self-sustained and self-propagated reaction generates heat, which facilitates the chemical decomposition of the polymer in the polymer matrix.

The energetic material includes, for example, a reducing agent such as a metal powder and an oxidizing agent such as a metal oxide or a polymer that produces an exothermic oxidation-reduction reaction known as a thermite reaction. Choices for a reducing agent include at least one of aluminum, magnesium, calcium, titanium, zinc, silicon, or boron, for example, while choices for an oxidizing agent include at least one of boron oxide, silicon oxide, chromium oxide, manganese oxide, iron oxide, copper oxide, nickel oxide, silver oxide, lead oxide, or polytetrafluoroethylene (PTFE), for example.

The amount and the composition of the energetic material are selected that the energetic material does not result in an explosion, rather the heat generated by the energetic material is used to facilitate the chemical decomposition of the polymer in the polymer matrix, not to physically destroy the matrix such as by explosion. A weight ratio of the polymer matrix to the energetic material is about 1:7 to about 1:1, preferably about 1:6 to about 1:2, more preferably about 1:5 to about 1:3.

The reinforcing fiber is used to increase the tensile strength and the compressive strength of the downhole article. The reinforcing fiber comprises at least one of carbon fiber, glass fiber, polyethylene fiber, or aramid fiber. The form of the reinforcing fiber is not particularly limited, and can include fiber filaments; fiber rovings; fiber yarns; fiber tows; fiber tapes; fiber ribbons; fiber meshes; fiber tubes; fiber films; fiber braids; woven fibers; non-woven fibers; or fiber mats. The reinforcing fiber can include at least one of continuous fibers or short fibers. Continuous fibers can be disposed within the disintegrable article along a reinforcing direction, providing a continuous path for load bearing, while short fibers can be blended into the polymer matrix in a random or semi-random orientation. Short fibers can include staple fibers, chopped fibers, or whiskers. Staple fibers typically have a lengths of about 10 to about 400 mm. Chopped fibers can have a lengths of about 3 to about 50 mm while whiskers are a few millimeters length. Combinations of the fibers in different forms and different compositions can be used.

Depending on the desired mechanical strength, a ratio of a total weight of the polymer matrix and the energetic material relative to a weight of the reinforcing fiber can be about 40:1 to about 5:1, preferably about 30:1 to about 10:1.

The disintegrable article can comprise a filler. Examples of the filler include at least one of carbon black, mica, clay, a ceramic material, a metal, or a metal alloy. Ceramic materials include SiC, $Si_3N_4$, $SiO_2$, BN, and the like. Examples of the metal or metal alloy can include at least one of lightweight aluminum alloys, magnesium alloys, or titanium alloys. The metal or metal alloy can also be the excess metal/metal alloy in the energetic material that does not participate in an oxidation-reduction reaction. The filler can be present in an amount of about 0.5 to about 10 wt. %, or about 1 to about 8% based on the total weight of the disintegrable article.

The reinforcing fiber, the filler, and the energetic material can be randomly distributed in the polymer matrix. Alternatively, the disintegrable articles can have a layered structure and comprise a first layer and a second layer disposed on the first layer, wherein the first layer contains the reinforcing fiber describe herein and the second layer comprises the polymer and the energetic material described herein.

It is appreciated that the disintegrable article can have more than one first layer and more than one second layer. For example, the disintegrable article can include alternating first and second layers. The thicknesses of the first and second layers are not particularly limited. In an aspect, the thickness of the first layer relative to the thickness of the second layer is about 10:1 to about 1:10 or about 5:1 to about 1:5, or about 2:1 to about 1:2.

Figure 1B:
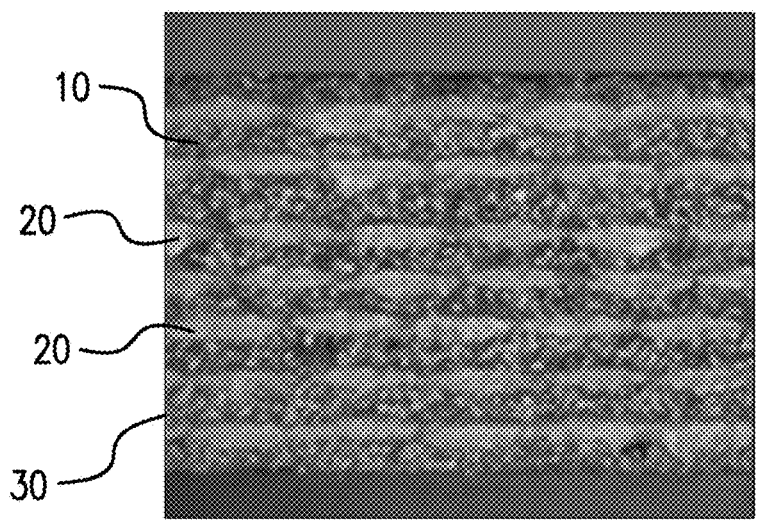
FIG. 1B is a microstructure of a cross section of the disintegrable downhole article of FIG. 1A.
Figure 2:
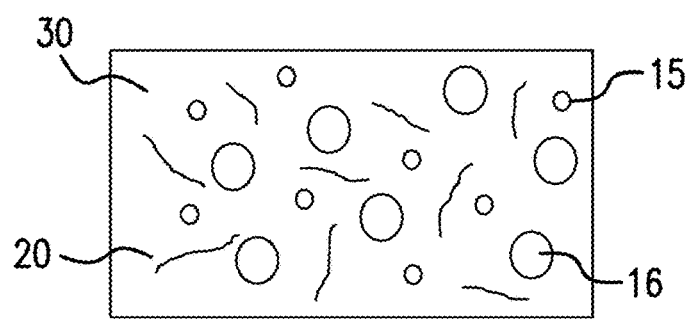
FIG. 2 is a schematic diagram of another embodiment of a disintegrable downhole article comprising a polymer matrix, an energetic material, and an reinforcing fiber.

The microstructures of the disintegrable articles are illustrated in FIGS. 1A, 1B, and 2. Referring to FIGS. 1A and 1B, the disintegrable article includes alternating layers A and B, where layer A contains a reinforcing fiber (20) and layer B contains an energetic material (10) and a polymer matrix (30). Referring to FIG. 2, the disintegrable article includes an energetic material (15, 16) and a reinforcing fiber (20) randomly disposed in the polymer matrix (30).

The polymer, the energetic material, and at least one of the reinforcing fiber or filler can form a composite. When the composite includes a continuous fiber (also referred to as continuous fiber composite), the composite can have a greater tensile strength than compressive strength. For example, the continuous fiber composite can have a tensile strength of about 40 to about 50 kilopound per square inch (ksi), determined in accordance with ASTM D3039. The continuous fiber composite can have a compressive strength of about 14 to about 33 ksi, determined in accordance with ASTM D6641. A ductility of the continuous fiber composite can be about 1 to about 4%.

When the composite comprises a short fiber (also referred to as "short fiber composite"), the composite can have a greater compressive strength than tensile strength. For example, the short fiber composite can have a tensile strength of about 10 to about 15 ksi, determined in accordance with ASTM D3039, and a compressive strength of about 25 to about 40 ksi, determined in accordance with ASTM D6641. A ductility of the short fiber composite can be about 5 to about 10%.

The disintegrable article comprise the composite and can be manufactured from the polymer, the energetic material, and at least one of the reinforcing fiber or the filler. In an aspect, a mold is alternately loaded with a reinforcing fiber, for example a reinforcing fiber layer or reinforcing fiber mesh and a combination comprising an energetic material and a polymer to provide a reinforced composition. The reinforced composition is then molded to form a disintegrable article. Alternatively, at least one of the reinforced fiber or a filler, the energetic material and the polymer can be mixed and then molded to form a disintegrable article. The disintegrable article can be further machined or shaped to form a disintegrable article having the desired structure.

The disintegrable article in the downhole assembly are not particularly limited. Examples of the article include a ball, a ball seat, a fracture plug, a bridge plug, a wiper plug, shear out plugs, a debris barrier, an atmospheric chamber disc, a swabbing element protector, a sealbore protector, a screen protector, a beaded screen protector, a screen basepipe plug, a drill in stim liner plug, ICD plugs, a flapper valve, a gaslift valve, a transmatic CEM plug, float shoes, darts, diverter balls, shifting/setting balls, ball seats, sleeves, teleperf disks, direct connect disks, drill-in liner disks, fluid loss control flappers, shear pins or screws, cementing plugs, teleperf plugs, drill in sand control beaded screen plugs, HP beaded frac screen plugs, hold down dogs and springs, a seal bore protector, a stimcoat screen protector, or a liner port plug. In specific embodiments, the disintegrable article is a ball, a fracture plug, a whipstock, a cylinder, or a liner plug. A downhole assembly comprising the disintegrable article is also provided. In addition to the disintegrable article, the downhole assembly can also include a string that carries the disintegrable article.

The disintegrable article disclosed herein can be controllably removed such that significant disintegration only occurs after the article has completed its functions. A method of controllably removing a disintegrable downhole article comprises: disposing a downhole assembly comprising the downhole article in a downhole environment; performing a downhole operation; activating the energetic material by initiating a self-propagation reaction of the energetic material to generate heat; exposing the polymer in the polymer matrix to the generated heat to chemically decompose the polymer producing a decomposed product comprising a small molecule in a supercritical state; and disintegrating the downhole article with the small molecule in the supercritical state.

The disintegrable article or a downhole assembly comprising the same can perform various downhole operations while the disintegration of the article is minimized. The downhole operation is not particularly limited and can be any operation that is performed during drilling, stimulation, completion, production, or remediation.

Once the disintegrable article is no longer needed, the disintegration of the article is activated. The method can further comprise receiving an instruction or signal to activate the energetic material, where the instruction or signal can be provided from above the ground or generated downhole. The instruction or signal can include at least one of an electric current, an electromagnetic radiation such as microwaves, a laser beam, a mud pulse, a hydraulic pressure, or a mechanical fore. Activating the energetic material can further comprise initiating a reaction of the energetic material to generate heat.

The disintegrable article can also include a sensor, which is operative to receive and process a signal to activate the energetic material. More than one sensor can be included, where each sensor can have the same or different functions. The sensor can be placed at a random or a pre-determined location in the disintegrable article.

To receive and process a signal to activate an energetic material, the sensor can include a receiver to receive a disintegration instruction or signal, and a triggering component that is effective to generate an electric current. Illustrative triggering component includes batteries or other electronic components. Once a disintegration instruction or signal is received, the triggering component generates an electric current and triggers the activation of the energetic material. The disintegration signal can be obtained from the surface of a wellbore or from a signal source in the well, for example, from a signal source in the well close to the disintegrable article.

When the polymer in the polymer matrix is exposed to the heat generated by the self-propagation reaction of the energetic material, the polymer chemically decomposes producing a decomposed product containing at a small molecule that can be turned into a supercritical state.

As used herein, a small molecule refers to a compound having less than 16, less than 10, or less than 8 carbon atoms. Examples of the small molecules include at least one of acetylene, ethylene, methane, carbon dioxide, carbon monoxide, formaldehyde, a phenol, a bisphenol, or water. The produced small molecules are subject to an elevated temperature and a super-atmospheric pressure. When the elevated temperature and super-atmospheric pressure exceed a supercritical temperature and a supercritical pressure of the small molecule, the small molecule is turned into a supercritical state. The elevated temperature can be provided by the heat generated by the self-propagation reaction of the energetic material. The super-atmospheric pressure applied to the small molecule can be provided by a downhole environment. Because there is no boundary between liquid and gas for compounds in a supercritical state, decomposing the polymer can result in a minimal pressure increase, which avoids explosion, or choking of the self-propagation reaction of the energetic material, or otherwise uncontrolled disintegration of the downhole articles. In an aspect, chemically decomposing the polymer as described herein can result in a pressure increase of less than about 100 psi or less than about 80 psi under a hydrostatic pressure of 400 to 1500 psi in a downhole environment.

Advantageously, the decomposition of the polymer is not affected or counteracted by the downhole hydrostatic pressure. The downhole article can disintegrate in tens of seconds with direct contact to downhole fluid under hydrostatic pressures once the energetic material is activated. The disintegration of the downhole article is safe to the adjacent tools including seal elements as the decomposition of the polymer results in minimal pressure and temperature increase. In addition, there is no explosion or flames during the disintegration of the downhole article, and the disintegration does not create projectiles or shock waves which may have undesirable consequences.

The disintegrable article and method of use are further illustrated in the example.

EXAMPLE

A test coupon was made of a composite of an epoxy matrix, an energetic material, and a fiber with a weight ratio of 22:66:5. The epoxy resin comprised 60-80 wt % bisphenol A diglycidyl ether (CAS #1675-54-3) and the balance being phenol-formaldehyde polymer glycidyl ether (CAS #28064-14-4) and 1,4-butane diglycidyl ether (CAS #2425-78-8).

The composite had a tensile strength of about 45 ksi, determined in accordance with ASTM D3039; and a compressive strength of about 18 ksi, determined in accordance with ASTM D6641. The composite also had a ductility of about 2%.

Figure 3A:
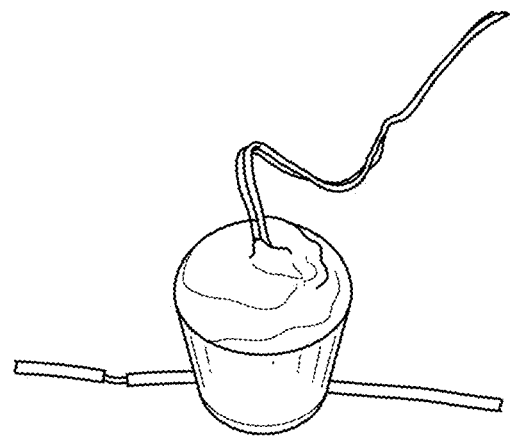
FIG. 3A shows a coupon made from a polymer having an oxygen content of 2-30 wt %, an energetic material, and a reinforcing fiber.
Figure 3B:
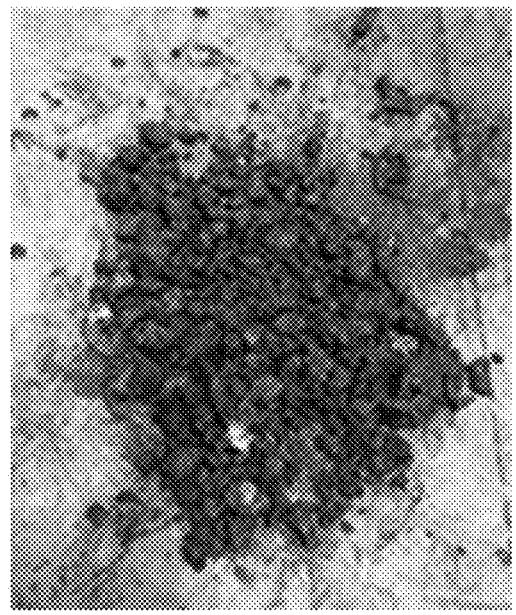
FIG. 3B shows the disintegrated coupon of FIG. 3A.
Figure 4:
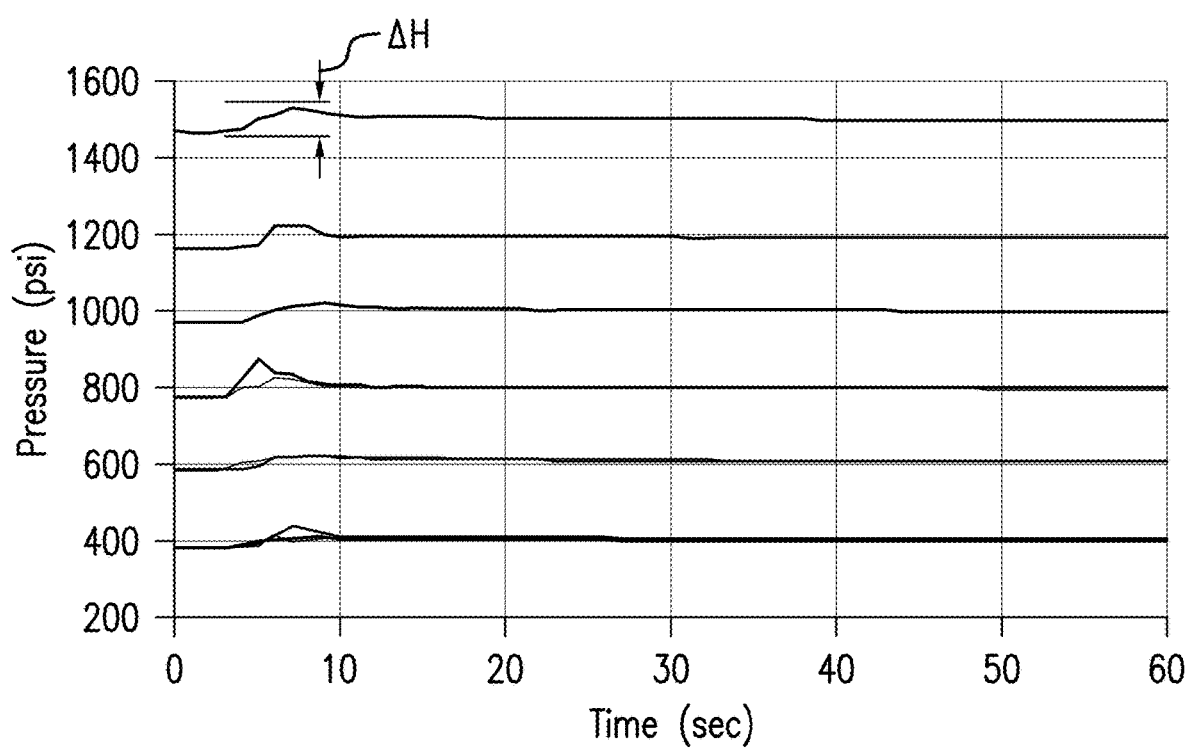
FIG. 4 is a graph of pressure (pound per square inch, psi) versus time (second, see) illustrating the pressure in an autoclave as a function of time after the energetic material in the coupon of FIG. 3A is activated in the autoclave.

FIG. 3A is a coupon with a watertight trigger sealed and embedded inside the coupon. A ceramic crucible wrapped and covered with steel mesh was placed outside the coupon to restrict the coupon remaining submerged during the test. Then the coupon was submerged under a test fluid in an autoclave (high pressure vessel). And then the autoclave was closed and pressurized with compressed gas to test the hydrostatic pressure effect under downhole conditions. The trigger was then activated, and after the test, the coupon was completely disintegrated into small pieces as shown in FIG. 3B. The decomposed pieces do not have the strength of the coupon and can be readily pulverized. FIG. 4 shows that a pressure increase ($\Delta H$) resulted from the decomposition of the polymer is about 50 psi under high hydrostatic pressures from 400 to 1500 psi. A peak temperature rise of about 55° F. was recorded near the test coupon.

Set forth below are various embodiments of the disclosure.

Aspect 1. A downhole assembly comprising a disintegrable article that comprises a polymer matrix comprising a polymer having an oxygen content of about 2 wt % to about 30 wt %; an energetic material configured to generate heat upon activation to facilitate a chemical decomposition of the polymer; and at least one of a reinforcing fiber or a filler.

Aspect 2. The downhole assembly as in any prior aspect, wherein the polymer is at least one of an epoxy, a phenolic resin, an epoxy phenolic resin, a vinyl ester, a polybismaleimide, a cyanate ester, or a polyester.

Aspect 3. The downhole assembly as in any prior aspect, wherein the polymer is an epoxy derived from at least one of butanediol diglycidyl ether, bisphenol-A diglycidyl ether, bisphenol-F diglycidyl ether, or phenol-formaldehyde polymer glycidyl ether.

Aspect 4. The downhole assembly as in any prior aspect, wherein the energetic material comprises a reducing agent comprising at least one of aluminum, magnesium, calcium, titanium, zinc, silicon, or boron, and an oxidizing agent comprising at least one of boron oxide, silicon oxide, chromium oxide, manganese oxide, iron oxide, copper oxide, nickel oxide, silver oxide, lead oxide, or polytetrafluoroethylene.

Aspect 5. The downhole assembly as in any prior aspect, wherein a weight ratio of the polymer matrix to the energetic material is about 1:7 to about 1:1.

Aspect 6. The downhole assembly as in any prior aspect, wherein the disintegrable article comprises the reinforcing fiber, the reinforcing fiber comprising at least one of carbon fiber, glass fiber, polyethylene fiber, or aramid fiber.

Aspect 7. The downhole assembly as in any prior aspect, wherein a ratio of a total weight of the polymer matrix and the energetic material relative to a weight of the reinforcing fiber is about 40:1 to about 5:1.

Aspect 8. The downhole assembly as in any prior aspect, wherein the disintegrable article comprises a first layer and a second layer; and the first layer comprises the reinforcing fiber and the second layer comprises the polymer and the energetic material.

Aspect 9. The downhole assembly as in any prior aspect, wherein the thickness of the first layer relative to the thickness of the second layer is about 1:10 to about 10:1.

Aspect 10. The downhole assembly as in any prior aspect, wherein the disintegrable article comprises alternating first and second layers.

Aspect 11. The downhole assembly as in any prior aspect, wherein the disintegrable article comprises the reinforcing fiber, and the energetic material and the reinforcing fiber are randomly disposed in the polymer matrix of the disintegrable article.

Aspect 12. The downhole assembly as in any prior aspect, wherein the disintegrable article further comprises a sensor that is operative to receive and process a signal to activate the energetic material.

Aspect 13. A method of controllably removing a disintegrable article, the method comprising: disposing a downhole assembly in a downhole environment, the downhole assembly comprising the disintegrable article which comprises a polymer matrix comprising a polymer having an oxygen content of about 2 wt % to about 30 wt %, an energetic material configured to generate heat upon activation to facilitate a chemical decomposition of the polymer, and at least one of a reinforcing fiber or a filler; performing a downhole operation; activating the energetic material by initiating a self-propagation reaction of the energetic material to generate heat; exposing the polymer in the polymer matrix to the generated heat to chemically decompose the polymer producing a decomposed product comprising a small molecule in a supercritical state; and disintegrating the disintegrable article with the small molecule in the supercritical state.

Aspect 14. The method as in any prior aspect, wherein the small molecule comprises at least one of acetylene, ethylene, methane, carbon dioxide, carbon monoxide, formaldehyde, a phenol, a bisphenol, or water.

Aspect 15. The method as in prior aspect, wherein producing the decomposed product comprises decomposing the polymer, and heating the small molecule in the decomposed product to a temperature above a supercritical temperature of the small molecule while applying a pressure to the small molecule, and the pressure is above a supercritical pressure of the small molecule.

Aspect 16. The method as in any prior aspect, wherein small molecule is heated to a temperature above a supercritical temperature of the small molecule by the heat generated by the self-propagation reaction of the energetic material.

Aspect 17. The method as in any prior aspect, wherein the pressure applied to the small molecule is provided by a downhole environment.

Aspect 18. The method any in any prior aspect, wherein producing the decomposed product increases a pressure applied against the disintegrable article by less than about 100 psi.

Aspect 19. The method as in any prior aspect, wherein activating the energetic material comprises providing a command signal to the disintegrable article, the command signal comprising at least one of electric current, electromagnetic radiation, or laser beam.

Aspect 20. The method as in any prior aspect, wherein the polymer is at least one of an epoxy, a phenolic resin, an epoxy phenolic resin, a vinyl ester, a polybismaleimide, a cyanate ester, or a polyester; and the energetic material comprises a reducing agent and an oxidizing agent, the reducing agent comprising at least one of aluminum, magnesium, calcium, titanium, zinc, silicon, or boron, and the oxidizing agent comprising at least one of boron oxide, silicon oxide, chromium oxide, manganese oxide, iron oxide, copper oxide, nickel oxide, silver oxide, lead oxide, or polytetrafluoroethylene.

Aspect 21. The method as in any prior aspect, wherein a weight ratio of the polymer matrix to the energetic material is about 1:7 to about 1:1.

All ranges disclosed herein are inclusive of the endpoints, and the endpoints are independently combinable with each other. As used herein, "combination" is inclusive of blends, mixtures, alloys, reaction products, and the like. All references are incorporated herein by reference in their entirety.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." The modifier "about" used in connection with a quantity is inclusive of the stated value and has the meaning dictated by the context (e.g., it includes the degree of error associated with measurement of the particular quantity).

What is claimed is:

1. A downhole assembly comprising a disintegrable article that comprises
    a polymer matrix comprising a polymer having an oxygen content of about 2 wt % to about 30 wt %;
    an energetic material configured to generate heat upon activation to facilitate a chemical decomposition of the polymer; and
    at least one of a reinforcing fiber or a filler.

2. The downhole assembly of claim 1, wherein the polymer is at least one of an epoxy, a phenolic resin, an epoxy phenolic resin, a vinyl ester, a polybismaleimide, a cyanate ester, or a polyester.

3. The downhole assembly of claim 1, wherein the polymer is an epoxy derived from at least one of butanediol diglycidyl ether, bisphenol-A diglycidyl ether, bisphenol-F diglycidyl ether, or phenol-formaldehyde polymer glycidyl ether.

4. The downhole assembly of claim 1, wherein the energetic material comprises
    a reducing agent comprising at least one of aluminum, magnesium, calcium, titanium, zinc, silicon, or boron, and
    an oxidizing agent comprising at least one of boron oxide, silicon oxide, chromium oxide, manganese oxide, iron oxide, copper oxide, nickel oxide, silver oxide, lead oxide, or polytetrafluoroethylene.

5. The downhole assembly of claim 1, wherein a weight ratio of the polymer matrix to the energetic material is about 1:7 to about 1:1.

6. The downhole assembly of claim 1, wherein the disintegrable article comprises the reinforcing fiber, the reinforcing fiber comprising at least one of carbon fiber, glass fiber, polyethylene fiber, or aramid fiber.

7. The downhole assembly of claim 1, wherein a ratio of a total weight of the polymer matrix and the energetic material relative to a weight of the reinforcing fiber is about 40:1 to about 5:1.

8. The downhole assembly of claim 1, wherein the disintegrable article comprises a first layer and a second layer; and the first layer comprises the reinforcing fiber and the second layer comprises the polymer and the energetic material.

9. The downhole assembly of claim 8, wherein the thickness of the first layer relative to the thickness of the second layer is about 1:10 to about 10:1.

10. The downhole assembly of claim 8, wherein the disintegrable article comprises alternating first and second layers.

11. The downhole assembly of claim 1, wherein the disintegrable article comprises the reinforcing fiber, and the energetic material and the reinforcing fiber are randomly disposed in the polymer matrix of the disintegrable article.

12. The downhole assembly of claim 1, wherein the disintegrable article further comprises a sensor that is operative to receive and process a signal to activate the energetic material.

13. A method of controllably removing a disintegrable article, the method comprising:
   disposing a downhole assembly in a downhole environment, the downhole assembly comprising the disintegrable article which comprises a polymer matrix comprising a polymer having an oxygen content of about 2 wt % to about 30 wt %, an energetic material configured to generate heat upon activation to facilitate a chemical decomposition of the polymer, and at least one of a reinforcing fiber or filler;
   performing a downhole operation;
   activating the energetic material by initiating a self-propagation reaction of the energetic material to generate heat;
   exposing the polymer in the polymer matrix to the generated heat to chemically decompose the polymer producing a decomposed product comprising a small molecule in a supercritical state; and
   disintegrating the disintegrable article with the small molecule in the supercritical state.

14. The method of claim 13, wherein the small molecule comprises at least one of acetylene, ethylene, methane, carbon dioxide, carbon monoxide, formaldehyde, a phenol, a bisphenol, or water.

15. The method of claim 13, wherein producing the decomposed product comprises decomposing the polymer, and heating the small molecule in the decomposed product to a temperature above a supercritical temperature of the small molecule while applying a pressure to the small molecule, and the pressure is above a supercritical pressure of the small molecule.

16. The method of claim 15, wherein small molecule is heated to a temperature above a supercritical temperature of the small molecule by the heat generated by the self-propagation reaction of the energetic material.

17. The method of claim 15, wherein the pressure applied to the small molecule is provided by a downhole environment.

18. The method of claim 13, wherein producing the decomposed product increases a pressure applied against the disintegrable article by less than about 100 psi.

19. The method of claim 13, wherein activating the energetic material comprises providing a command signal to the disintegrable article, the command signal comprising at least one of electric current, electromagnetic radiation, or laser beam.

20. The method of claim 13, wherein
   the polymer is at least one of an epoxy, a phenolic resin, an epoxy phenolic resin, a vinyl ester, a polybismaleimide, a cyanate ester, or a polyester; and
   the energetic material comprises a reducing agent and an oxidizing agent, the reducing agent comprising at least one of aluminum, magnesium, calcium, titanium, zinc, silicon, or boron, and the oxidizing agent comprising at least one of boron oxide, silicon oxide, chromium oxide, manganese oxide, iron oxide, copper oxide, nickel oxide, silver oxide, lead oxide, or polytetrafluoroethylene.

21. The method of claim 13, wherein a weight ratio of the polymer matrix to the energetic material is about 7:1 to about 1:1.

* * * * *